(12) United States Patent
Larsen

(10) Patent No.: US 6,539,896 B1
(45) Date of Patent: Apr. 1, 2003

(54) ARRANGEMENT FOR INDIVIDUAL FEEDING OF FREE-RANGE ANIMALS

(75) Inventor: Jesper Kristoffer Larsen, Daugard (DK)

(73) Assignee: Kristoffer Larsen Innovation A/S, Daugard (DM)

( * ) Notice: Subject to any disclaimer, the term of this patent is extended or adjusted under 35 U.S.C. 154(b) by 0 days.

(21) Appl. No.: 09/869,017

(22) PCT Filed: Dec. 23, 1999

(86) PCT No.: PCT/DK99/00730

§ 371 (c)(1),
(2), (4) Date: Aug. 30, 2001

(87) PCT Pub. No.: WO00/38502

PCT Pub. Date: Jul. 6, 2000

(30) Foreign Application Priority Data

Dec. 23, 1998 (DK) .......................................... 1998 01717
Sep. 1, 1999 (DK) .......................................... 1999 01213

(51) Int. Cl.[7] .............................. A01K 1/10; A01K 5/00; A01K 7/00; A01K 9/00
(52) U.S. Cl. .................................... 119/515; 119/51.01
(58) Field of Search ........................... 119/51.01, 14.01, 119/14.02, 14.03, 515

(56) References Cited

U.S. PATENT DOCUMENTS

| | | | |
|---|---|---|---|
| 3,095,854 A | | 7/1963 | Bott et al. |
| 3,765,373 A | * | 10/1973 | Phillips .................... 119/14.04 |
| 4,508,058 A | * | 4/1985 | Jakobson et al. ......... 119/14.02 |
| 4,517,923 A | | 5/1985 | Palmer |
| 4,617,876 A | | 10/1986 | Hayes |
| 5,355,833 A | | 10/1994 | Legrain |
| 5,579,719 A | | 12/1996 | Hoff et al. |
| 5,673,647 A | | 10/1997 | Pratt |
| 5,784,993 A | * | 7/1998 | Osthues et al. .......... 119/14.02 |
| 6,050,219 A | * | 4/2000 | van der Lely ........... 119/14.04 |

FOREIGN PATENT DOCUMENTS

| | | |
|---|---|---|
| DE | A3623816 | 1/1987 |
| DE | A3701864 | 8/1988 |
| GB | A2190574 | 11/1987 |
| GB | A2220834 | 1/1990 |
| GB | A2232053 | 12/1990 |
| WO | A9103930 | 4/1991 |
| WO | WO 9731526 | 9/1997 |

* cited by examiner

Primary Examiner—Charles T. Jordan
Assistant Examiner—Judith A. Nelson
(74) Attorney, Agent, or Firm—Birch, Stewart, Kolasch & Birch, LLP

(57) ABSTRACT

An arrangement for feeding of animals, in particular pigs and sows, kept in a free-range herd, comprises a carrousel divided into a number of feeding enclosures so that a large number of animals may be automatically and individually fed. A common inlet with a registration system leads to the feeding enclosures of the carrousel. The animals are identified, weighed and may optionally have the temperature, the thickness of the fat layer and an image recorded. All data are stored in a computer system controlling the operation of the arrangement, including separation of animals from the herd. The computer system optionally being connected to a remote, central computer for surveillance of its operation and of the individual animal.

30 Claims, 3 Drawing Sheets

ARRANGEMENT FOR INDIVIDUAL FEEDING OF FREE-RANGE ANIMALS

This application is the national phase under 35 U.S.C. §371 of PCT International Application No. PCT/DK99/00730 which has an International filing date of Dec. 23, 1999, which designated the United States of America and was published in English.

The present invention relates to an arrangement for feeding of animals, in particular pigs, kept in a free-range herd. The arrangement comprises a carrousel divided into a number of feeding enclosures so that a large number of animals may be individually fed automatically within a small area. The invention may in particular be applied to feeding animals that are being bred for meat production, i.e. for slaughtering, but it may advantageously be applied to feeding of sows, cows, etc.

BACKGROUND OF THE INVENTION

It is known to feed sows on an individual basis, wherein the amount and composition of feed depends on a number of circumstances, mainly regarding whether the sow is pregnant, is nursing piglets, etc. The sows may be equipped with a transponder, often placed in an earmark, for individual automatic identification of the sow. The identification may be used for automatic individual feeding of sows, for separation of the sow for insemination or for farrowing, etc.

Porkers, herein meaning pigs that are bred for meat production, i.e. for slaughtering, are today in modern meat production fed as a bulk and individual feeding of the animals may only be provided manually. The animals are typically kept in groups of 15–20 animals. However, if the animals are kept in larger herds, more that 50 animals but often even much more, stronger or more aggressive animals will tend to keep other animals away from the common feeding bowls, resulting in a large deviation in size and weight of pigs of similar ages. This has the effect that a herd of porkers of similar age may reach the desired final weight over a period of several week, thus letting the production means for raising the porkers be more or less idle over most of the period. Furthermore, the feed is utilised less effectively by the porkers that are not fed properly, resulting in higher consumption of feed per kilogram meat produced. Also, the use of arrangements for automating the slaughtering process partly or completely is tremendously simplified if animals of a highly uniform weight can be produced. Finally, the health of the badly fed porkers may suffer from the conditions.

Known arrangements for individual feeding of animals are expensive to purchase for a larger herd of animals, in particular arrangements wherein each animal is identified, since each unit may only feed one animal at a time. Such arrangements take up plenty of square-metres of area relatively to the number of animals in the herd because each arrangement has a separate inlet and outlet for the animals.

The above-mentioned problems are of special importance for out-door breeding of porkers, which presents the added problem of the exposure of the animals to the temperature and wind speed variations of the open air environment, calling for adjustment of the amount of feed. However, the invention is applicable to free-range breeding of porkers and other animal indoor as well as outdoor, and the problem of variations in environmental temperature for the animals may also occur with indoor breeding, but usually to a less extent than with outdoor breeding.

A feeding apparatus for individual feeding of animals is disclosed in GB 2 220 834 in which the animals are simultaneous weighted and fed in the same enclosure and the feed is dispersed according to the animal's weight. In particular, a feeding carrousel capable of carrying up to 12 animals each in one enclosure on the carrousel at one time is disclosed in which a load cell determines the total weight of the carrousel and the animals thereon and the weight of an animal entering an enclosure of the carrousel is computed from the change in the total weight. An exit gate from the enclosure is opened when the animal is expected to have finished eating and the animal may be urged to leave the enclosure, but no means for urging the animal are disclosed.

Another apparatus for automatic, individual feeding of animals is disclosed in DE 37 01 864 in which the animals are weighted and/or identified at one station from which each animal is selectively lead to one of a plurality of individual feeding pens, is lead back to the stock if they have been fed or is lead to a separation area by means of moving or turning the weighting/identification station between the different destinations. The identification of the animals is made by means of an identification tag fastened to each animal and the amount of feed in the feeding pens is measured out for the individual animal.

U.S. Pat. No. 4,517,923 discloses an automatic animal feeding system, in particular for cows, in which the animals are fed individually upon identification of the animal from automatically reading of an identification tag attached to each of the animals. The amount of feed provided to the animal is based on information collected about each animal, such as the animal's weight. The animal may be weighted manually where after the weight is entered into the control system, or the animals may be weighted automatically on a commonly accessible scale which periodically measured the weight of the animal, on scales provided in the feeding pens or on scales provided in the parlour stalls.

An automatic feeding pen for animals is disclosed in WO 91/03930 in which the animals can eat individually and the identity of the animal is recorded together with the amount of feed consumed so at to monitor the amount of feedstock taken by each animal. Each of the animals is provided with a transmitting device to enable individual identification of the animals.

GB 2 232 053 relates to a system for feeding free-range sows provided with a transponder each. The system comprises an antenna, which registers passing sows and communicates with a computer, which selects whether the sow should be fed. If so, the sow is allowed to enter a receiving area in front of the feeding machines. The amount of food available to the sows may be set to an individual level for each animal and the amount of feed consumed by each animal is monitored.

U.S. Pat. No. 5,673,647 relates to an. automated method and system for providing individual animal electronic identification, measurement and value based management of cattle in a large cattle feedlot. Animals are individually identified and measured by weight, external dimensions and characteristics of internal body tissue. The individual identification and registration of the cattle with respect to physical and other information is used for calculating the optimal time for slaughtering. There is no mentioning of an individual feeding of the cattle or feeding means and the cattle are fed directly on the ground in the herd.

The carrousel disclosed in GB 2 220 834 is advantageous because a large number of animals may be individually fed automatically within a small area. However, the disclosed method of determining the weight of the individual animal, which is an important parameter for determining the overall condition of the animal and for determining the amount of fed to be dispersed to the animal, has shown to have some disadvantages. It is difficult to obtain a precise measure of the weight of a platform that is turning due to vibrations from the drive means and the animals on the platform are at the same time moving around and disturbing the measurement further. It is also difficult to perform regular calibration of the scale in a non-loaded state because it demands a halt of the operation of the carrousel for a longer period as the feeding enclosures must be emptied. Another disadvantage is that a separation of the animals based on their weight requires two outlets from the carrousel, one outlet leading to the common area for the herd and one outlet leading to a separation area, e.g. as shown in GB 2 220 834.

Another problem to be solved for the above carrousel is that experience has shown that the animals and in particular pigs are not by themselves urged to leave the feeding enclosures on the carrousel at the right time. On the contrary, the animals try to stay near the feeding bowl although it is emptied and disturb thereby the operation of the feeding arrangement.

DESCRIPTION OF THE INVENTION

Thus, it is an objective of the present invention to provide an arrangement for individual feeding of animals that is of compact form and takes up a minimum of area in which the weight of the individual animal is determined in a reliable manner prior to entering the arrangement.

In particular, it is an objective of the present invention to provide an arrangement for individual feeding of animals in a number of feeding enclosures arranged on a turning platform in which each of the animals are weighted separately before they enter the platform.

It is another objective of the present invention to provide an arrangement for individual feeding of animals in a number of feeding enclosures arranged on a turning platform which arrangement comprises means for expelling an animal from each of the enclosures when the enclosure is in an outlet angular position.

It is a further objective to provide an arrangement comprising means for identifying the individual pig upon passing the inlet.

It is a still further objective to provide an arrangement in which the animals may be separated for slaughtering, for insemination, due to illness etc. after the weighing or in connection with the weighing but before they are lead to the feeding enclosures.

Thus, the present invention relates to an arrangement for individual feeding of animals of a herd comprising a plurality of enclosures each of a size suitable for comprising one of the animals and being arranged on a platform which may turn about a substantially vertical axis, each enclosure having an opening and means for selectively switching the opening between a for the animals passable state and a non-passable state, drive means for rotating the platform, supply means for supplying feed to each of said enclosures, an inlet through which the animals may enter into each one of the enclosures when the opening of said enclosure is in a given inlet angular position, means for selectively allowing animals to pass the inlet, the inlet being so arranged that the animals may only enter the arrangement when in operation by passing the inlet, and an outlet through which the animals may exit from each one of the enclosures when the opening of said enclosure is in a given outlet angular position.

In a preferred embodiment, the arrangement further comprises an weighting enclosure of a size suitable for comprising one of the animals, in which the above described inlet of the arrangement according to one embodiment forms the inlet of the weighting enclosure and the weighting enclosure in an alternative embodiment is arranged between the platform and a common outlet, the weighting enclosure having means for selectively allowing an animal within the enclosure to leave the weighting enclosure and having means for determining the weight of the animal and means for transmitting the weight to control means for controlling the operation of the arrangement, the weighting enclosure being so arranged that animals may only enter, respectively leave, the arrangement when in operation by passing through the weighting enclosure.

Alternatively or additionally, the weighting enclosure may further comprise means for determining at least one of the following characteristics of each animal passing the arrangement and for transmitting the at least one characteristic to the control means:

a) a temperature of the animal measured by means of a sensor, b) a thickness of the fat layer on the back of the animal, and c) an image obtained by means of a camera.

The temperature may e.g. be a skin temperature of the animal measured from the infra red radiation from the animal or the body temperature of the animal measured by means of a sensor mounted on the animal. An image of the animal may, as disclosed in U.S. Pat. No. 5,673,647 be used for computing characteristics of e.g. the meat quality or the meat/fat ratio and distribution.

In another preferred embodiment, the arrangement with or without the weighting enclosure comprises expelling means for expelling an animal from each one of the plurality of enclosures when the opening of said enclosure is in the outlet angular position.

Advantageously, the arrangement comprises means for performing a unique identification of each animal of the herd, the means being arranged so as to allow for identification of an animal before letting it into the arrangement. The identification is performed automatically and the identification means on each animal may be the eyes or other natural but unique characteristic of the animal or it may be a mark bearing a code, such as a visual code like a bar code, a letter code or other visual signs. However, in a preferred embodiment, the arrangement comprises a plurality of transponders each having a unique identification code, each animal of the herd being equipped with a transponder for individual identification, and a transceiver for reading the identification codes of the transponders, the transceiver being arranged near the common inlet so as to allow for identification of an animal before letting it into the arrangement.

Furthermore, the arrangement may further comprising means for selectively separating identified animals having passed the common inlet to at least one separation enclosure. The reason for separation may be that the animal is to be slaughtered, is ill or, if the herd comprises sows, is in heat and should be inseminated, is about to farrow etc.

The most simple and preferred way of switching between the passable state and the non-passable state of the opening of each of the plurality of enclosures is by performing the switching by the rotational movement of the platform, i.e. without the use of movable gates or doors.

In order to prevent the animals from getting wedged between part on the platform and stationary parts exterior to the platform, it is advantageous that the arrangement further comprises monitoring means for monitoring the load on the drive means and producing an output accordingly, and drive control means for selectively halting the operation of the drive means in response to the output from the monitoring means.

For safety reason and in order to make the arrangement operational without the possibility for immediate human interaction in case of malfunctions, the arrangement may be equipped with safety means for automatically allowing animals within the arrangement to leave the arrangement, and safety control means to activate said safety means in response to malfunction of the arrangement that otherwise would entrap any of the animals in the arrangement. In a simple version, each animal is allowed to eat the amount it desires when being alone in the feeding enclosure. However, in a preferred embodiment of the invention, the control means controlling the operation of the arrangement may control the amount of and optionally the type of feed supplied to the individual identified animal. The type of feed may be a mixture of different types of feed supplied from a number of feed containers.

It is advantageous that the supply of feed to the individual animal can be adjusted according to the environmental condition for indoor as well as outdoor breeding of pigs but the environmental conditions are naturally of higher importance for outdoor breeding. Thus, the arrangement may comprise means for adjusting the amount of feed supplied to the individual animal according to the temperature and optionally the wind speed the animals are subjected to.

The arrangement may be used for several types of animals, such as sheep, cattle and ostriches, but the arrangement according to the invention is in particular suitable for individual feeding of pigs, especially porkers.

The control unit may further comprise means for determining whether an identified animal should be separated from the herd and means for activating separation means unit so as to separate said animal from the weighting enclosure into a separation enclosure.

Furthermore, for embodiments in which a temperature of the identified animal is determined automatically within the weighting enclosure the separation of the identified animal may be effected by the control unit in response to the determined temperature of said animal.

The control unit may in a further preferred embodiment be at least temporarily connected via a data communication network to a remote surveillance system whereby the operation of the control unit may be remotely monitored and at least partially controlled.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE FIGURES

The present invention will become more fully understood from the detailed description given hereinbelow and the accompanying drawings which are given by way of illustration only, and thus are not limitative of the present invention, and wherein.

A preferred embodiment of the invention is shown in FIGS. 1–3 of which

Figure 1:
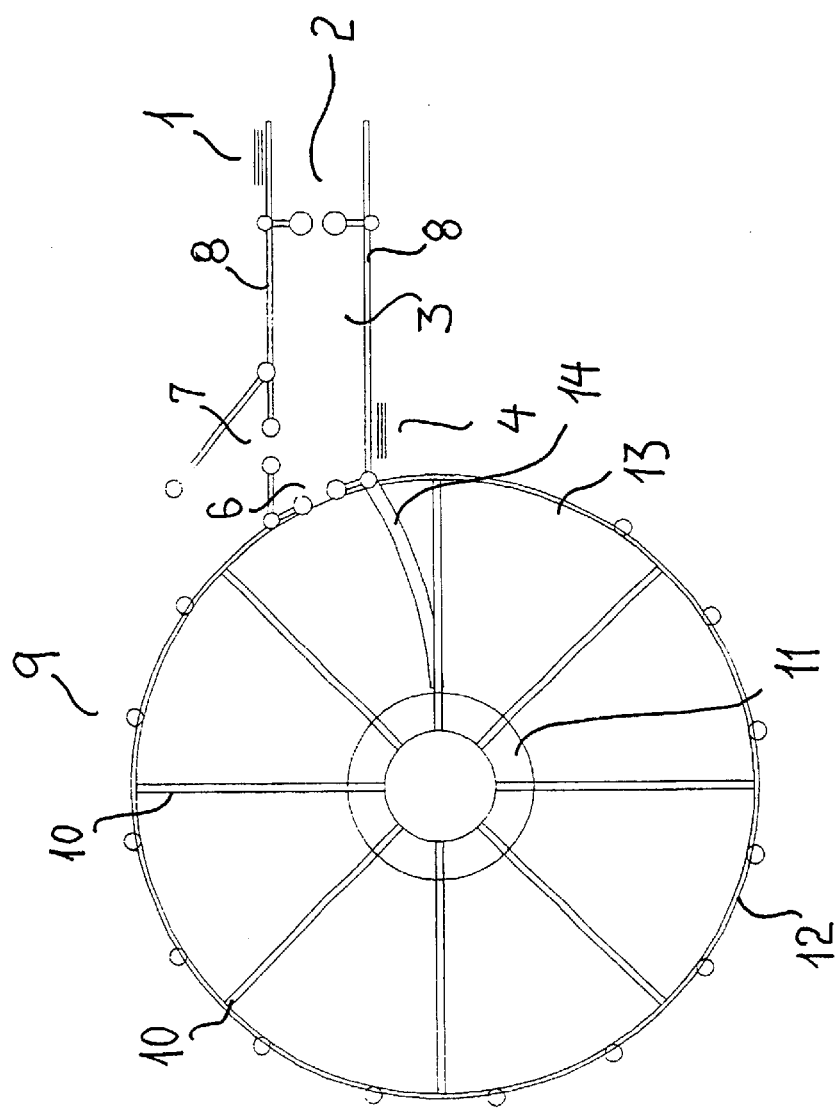
FIG. 1 shows an elevated view of an arrangement comprising separation equipment and a feeding carrousel.

The arrangement comprises separation equipment having a transceiver 1 for communicating with transponders in the earmarks of each of the animals for identification of the individual animals, an inlet gate 2 that is opened for an animal if the identification made by means of the transceiver 1 indicates that the animal should be fed, a scale 3 for determining the weight of the animal that have entered the separation enclosure defined by the gates 2, 6, 7, and the fence 8, a second transceiver 4 for verifying the identification of the animal, a first outlet gate 6 for providing access to the feeding carrousel 9 and a second outlet gate 7 for separating individual animals from the rest of the herd. Furthermore, the arrangement is equipped with an infra red sensor (not shown) for detecting the temperature of the skin of the animal that has entered the equipment and for communicating the measured value to a control unit.

Figure 3:
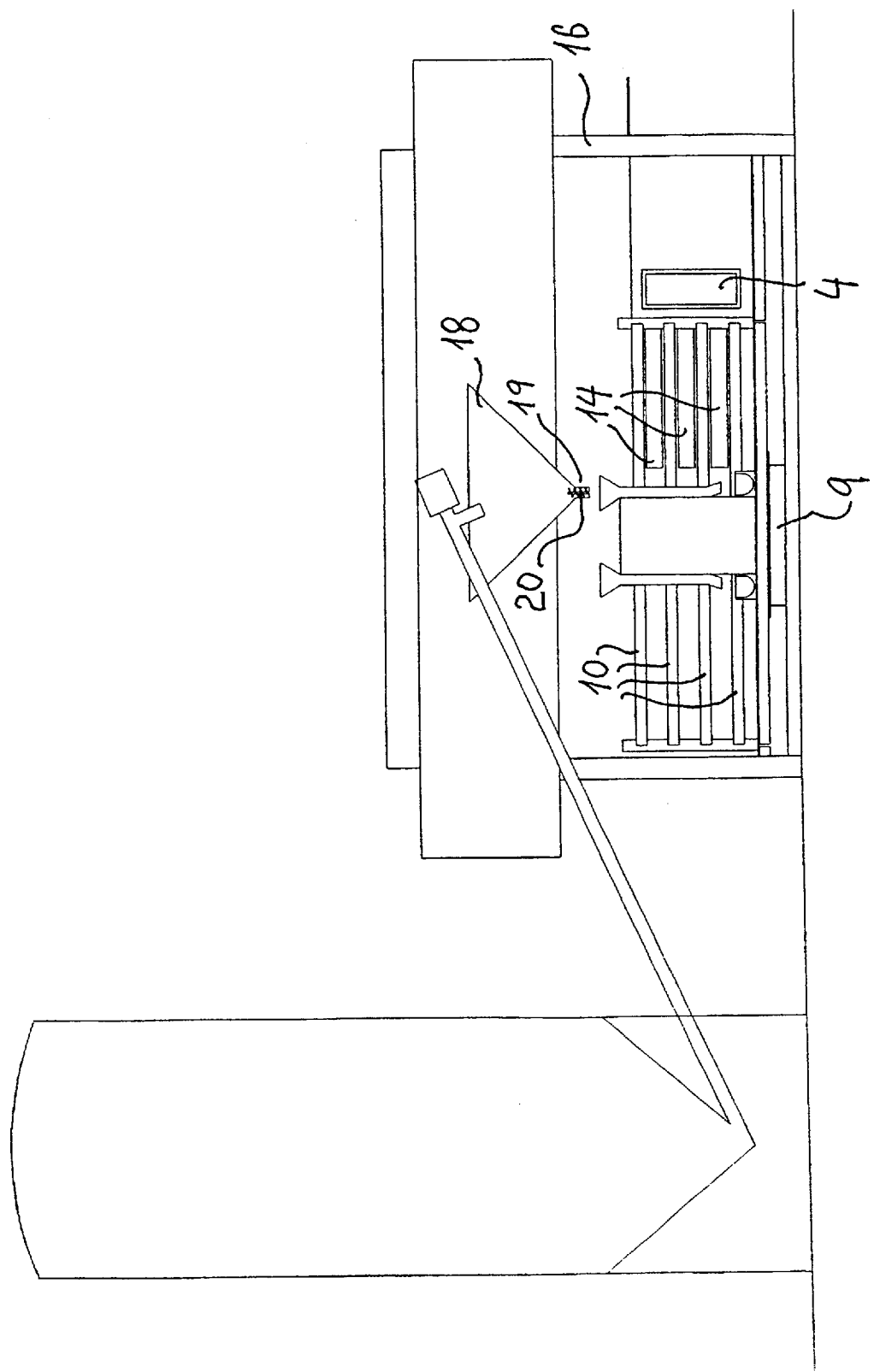
FIG. 3 shows a cross-section of the arrangement of FIG. 2.

The feeding carrousel 9 is divided with fences 10 into eight parts of a suitable size for accommodating an animal, each part comprising a feeding bowl 11 with supply for feed and optionally drinking water. The carrousel 9 on the figure is turning counter-clockwise with a typical rotational speed of about four turns per hour so that an animal will have seven eighths of a quarter of an hour (about thirteen minutes) to eat but the rotational speed is adjustable. Sows will typically need shorter time to consume their feed and a rotational speed of about twelve turns per hour will be suitable. The carrousel may in alternative embodiments be equipped with another number of parts or enclosures, typically from four to twelve or fourteen, depending on the size of the feeding carrousel and the animals to fed, and the rotational speed is adjusted accordingly to obtain a suitable time for the individual animal to consume their feed. The carrousel 9 is supported by a conical ball bearing as manufactured e.g. by Jost (Neu-lsenburg, Germany). The carrousel 9 is surrounded by a stationary fence 12 that covers most of the circumference of the carrousel 9 except at the gate 6 leading to the carrousel 9 and to the left of the gate 6 at the outlet position 13 where the animals are leaving the carrousel 9. An arm 14 is provided for expelling the animals from the part being at the outlet position 13. The arm 14 is slightly curving in the horizontal plane so at so prevent the animal from being wedged or squeezed. The fences 10 dividing the carrousel 9 and the arm 14 are formed from slats arranged so that the fences 10 may pass the arm 14, as being apparent from FIG. 3. The shown arm 14 comprises four slats but the arm 14 according to the invention comprises at least one slat and the fences have a opening defined therein for being able to pass the arm 14. The number of slats on the arm 14 and their shape and vertical position depends on the kind of animals to be fed in the arrangement.

The arm 14 may alternatively be mounted on the centre part of the carrousel 9 or it may be constructed as a turntable with approximately the same diameter as the carrousel 9 and turning in the same direction just above the floor of the carrousel 9. The centre of the turntable is situated just outside the perimeter of the carrousel 9 so that the animal are forced to jump onto the turntable which turns the animal and move it out from the part of the carrousel 9. The arm 14 is in an alternative embodiment replaced by a pushing member mounted on an air cylinder so that it may move along a radial to the carrousel 9 from the centre so as to push the animal from the part being at the outlet position 13, which may be combined with a turnable part of the floor in the part of the carrousel 9 that turns the animal within the part of the carrousel 9 a half-turn so that it is facing the periphery of the carrousel 9 before it is expelled. According to another alternative embodiment, the arm 14 is replaced by an air cylinder that lifts the inner end of a section of the floor of the carrousel 9 covering the part being at the outlet position 13 whereas the outer end of the floor section is hinged to a frame part of the carrousel 9 near the outer periphery of the carrousel 9 so that the animal is tipped out from the part of the carrousel 9. According to yet another embodiment, the section of the floor of the carrousel 9 covering the part being at the outlet position 13 is removed with the animal positioned on it either by dragging or lifting the floor section which is replaced by a similar floor section for allowing another animal to use the part of the carrousel 9. The above alternatives may also be combined in various ways to meet the requirement of expelling the animal from the part of the carrousel 9.

Figure 2:
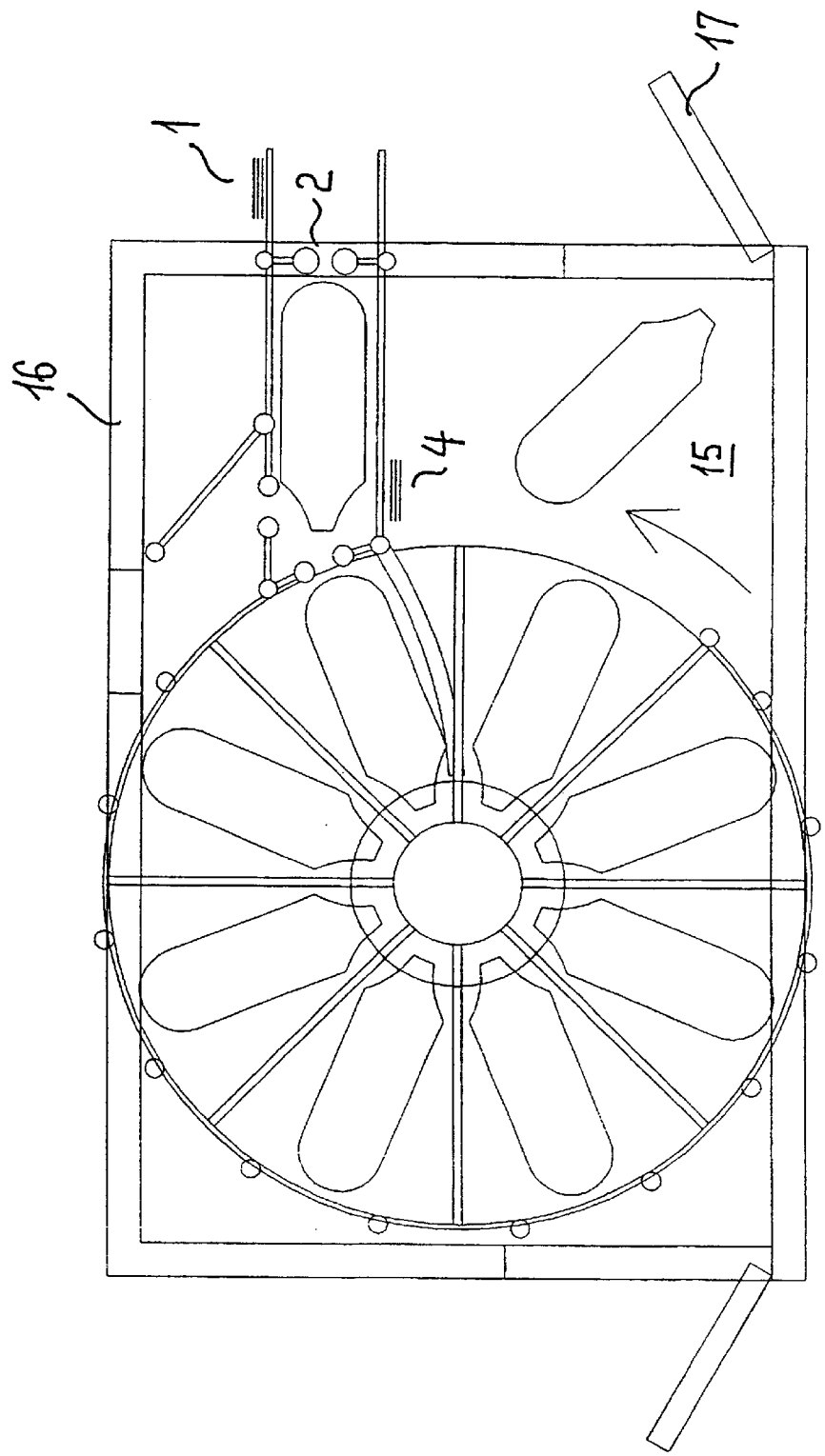
FIG. 2 shows the arrangement of FIG. 1 placed within a feeding hut.

The animals leave the carrousel 9 to an enclosure such as a part 15 of the feeding hut 16 as shown on FIG. 2. The animals may only leave the enclosure through a one-way door 17, thus assuring that the animals pass the feeding system in one direction.

The supply of feed to the feeding bowls 11 may be provided from a feed container 18 arranged under the ceiling of the feeding hut, the feed being led from the container 18 through an opening 19 in the lower part of the container to the feeding bowls 11. A screw conveyor 20 measures out a specified amount of feed to the individual animal that is fed from the specified feeding bowl 11. The amount of feed is for porkers and sows typically in the range of 0.2–3.5 kg.

The arrangement has a safety system to ensure that the animals will not suffer any harm in case of a malfunction of the system. The carrousel 9 is driven by a 220 V AC electric motor having an overload protection mechanism and the safety system comprises means for detecting an increased load on the motor for driving the carrousel 9 so as to detect e.g. whether an animal has become wedged and in that case cause the motor to stop so as to prevent the animal from being hurt. The motor is adjusted so that a wedged animal is able to easily push the carrousel in the opposite direction of the operating direction in order to free itself. The load on the motor may be measured from the phase shift of the motor or from a phase converter controlling the operation of the motor. Similar safety arrangements may be provided for other drive means, such as pneumatic or hydraulic motors, internal combustion engines etc. In case such an incident or another major malfunction is detected, the safety system stops the rotation of the carrousel 9 and a valve connecting a reservoir of pressurised air with a number of pneumatic cylinders is opened, causing the gates 2, 6 to open and the fences 10 dividing the carrousel 9 into parts to be raised, thus allowing the animals within the arrangement to leave it. The control system of the arrangement is permanently or temporarily connected via communication means to a surveillance system and the safety system provides a signal to the surveillance system in case of a malfunction. The arrangement may be reset from the surveillance system in case the malfunction is remotely correctable by the surveillance system.

The arrangement is used for controlled feeding of the individual animal of a free-range herd. The animals are preferably pigs for which individual feeding is advantageous for both sows and porkers that are raised for meat production. Both sows and porkers are fed with different compositions and amounts of feed depending on a number of circumstances. The feeding of the sows depends on whether they are in heat, are pregnant, are nursing piglets, are about to farrow, etc. and the feeding of the porkers depends on their age and weight, the so-called phase feeding programme. The individual control of the feeding of the animals ensures that the stronger or more aggressive animals do not keep other animals of the herd from the feed, which for large herds of porkers ensures a more homogeneous distribution of size and weight of porkers of the similar age and a generally better well-being and health of the animals. The free-range herds of porkers of similar age or of mixed age are often large, comprising 100, 200 or even 500 or more animals.

The feeding arrangement is equipped with a control unit, such as a computer having a logical unit and memory means for storing data, input and output units and means for controlling the operation of the arrangement. The feeding arrangement is advantageously used together with computer software for carrying out a method for feeding the animals, the computer software being stored within the memory means and controlling the steps of the operation of the arrangement. The operation of the feeding arrangement for a herd of animals each having an earmark comprising a transponder for unique identification is described below. The operation of the control unit is controlled by the computer software.

The transceiver 1 registers that an earmark is present within the sensing distance, typically about 600 mm, of the transceiver 1 and it is determined by the control unit whether the animal is to be fed or separated, in which two cases the animal is allowed into the separation arrangement. Commonly, the animals are fed twice a day. If the animal is allowed into the separation arrangement, the inlet gate 2 is opened. When the animal has entered the enclosure and is standing on the scale 3, the second transceiver 4 registers the identity of the earmark so as to confirm the identification of the animal and to determine that the animal is placed correctly within the enclosure so that the inlet gate 2 may be closed. The weight of the animal is determined from a signal received by the control unit from the scale 3 an adjustable period, typically of about 15 seconds, after the animal has entered the scale, and the weight is entered into a record of the individual animal. The scale 3 calibrates automatically when the enclosure is empty and the scale 3 is unloaded. Optionally, the arrangement also comprises means for measuring the surface temperature of the animal by measuring the infrared radiation from the animal, and alternatively or additionally the earmark may comprise a temperature sensor and means for transferring data regarding the measured temperature to the control unit. The registration of the body temperature serves the purposes of determining whether an animal is ill or, in case of a sow, determines whether the sow is in heat. The arrangement may also comprise means for measuring the thickness of the fat layer on the back of the animals, primarily for porkers.

The control unit now determines whether the animal should be fed, in which case the outlet gate 6 to the feeding carrousel 9 is opened, or the animal should be separated due to illness, a sow being in heat, for slaughtering or for other reasons, in which case the outlet gate 7 for separation is opened. The separation arrangement may optionally comprise more than one outlet gate for separation for different reasons and purposes, or the outlet gate 7 may lead to an enclosure having a plurality of outlet gates for selective separation. The opening of the outlet gate 6 to the feeding carrousel 9 is synchronised with the angular position of the carrousel 9 so that each animal is led to an open part of the carrousel 9. The outlet gate 6 or 7 is closed and the inlet gate 2 is ready to open for another animal at a predetermined time period, e.g., 10 seconds, after the outlet gate 6, 7 is opened. The outlet gate 6, 7 does not close if the animal has not left the enclosure completely but the inlet gate 2 is opened so that the following animal will push the preceding animal out from the enclosure. The outlet gate 6, 7 is closed in response to the signal from the second transceiver 4 indicating that no earmark or other transponder is within reading distance of the transceiver 4. Alternatively, the outlet gate 6, 7 is closed in response to the output from the scale 3 indicating that the animal has left the enclosure.

Feed is provided in the feeding bowl 11 in an amount determined by the control unit by activation of the screw conveyor 20. Optionally, the arrangement comprises more than one feed container 18 and the feed may be mixed individually for each animal. Sub-population of the animals may be fed with different types of feed in order to fulfil different requirements from different customers such as organically grown feed. Furthermore, a supply of drinking water may be provided within each part and means for dosing medicine into the feed for the individual animal may also be provided.

A record for each animal of the herd is kept within the memory means of the control unit. The record comprises the transponder identification number, an identification number, the day of birth of the animal, identification of sow and boar and weight at the age of 6–8 weeks. Optionally, the daily registered weight, temperature, amount of feed, the hour and minute of each daily feeding and/or the thickness of the layer of fat is also kept on record. For sows, data regarding expected heat, data regarding the day of insemination and day of expected farrowing and/or data regarding size of litter may also be kept on record.

A number significant of the utilisation of the feed, the E number, may be calculated as follows based on the recorded data:

$$E = \frac{\text{weight, day 2} - \text{weight, day 1}}{\text{feed consumption per day} * \text{number of days}}$$

= weight unit growth per consumed weigh unit of feed

The amount of feed for porkers is determined from a table stored within the memory means of the control unit and comprising data connecting the age, normal weight and amount and mixture of feed for the animals. If the weight of an animal deviates to the lower side from the normal weight with more than a certain percentage, e.g. 5%, the amount of feed for that particular animal is increased over a period. The lower weight may be caused by illness for which reason the effect of the increased amount of feed is monitored over a period and the animal is separated from the herd if the desired effect is not achieved. The amount of feed is in general raised for all animals if the temperature is low and/or for certain combinations of temperature and wind for animals living outdoor, because it takes more energy for the animals to keep the body temperature up. The amount of feed is typically raised with 5% due to cold weather but the amount of feed may be adjusted to more than one other level so that a more precise adaptation to the environment of the animals may be made.

The control unit is preferably connected to a surveillance system via a private or public communication network or a combination thereof. The communication between the person or persons who look after the free-range breeding arrangement and the herd of animals will most often take place via the network. The control unit may prepare operating reports to the surveillance system with a predetermined interval and/or on demand, and reports regarding malfunctions of the system are sent to the surveillance system. An operating report may comprise data regarding the individual animal and statistical data about the number of animals within a weight interval, the temperature of the animals, etc. The statistical data from the control unit may advantageously be used for optimising the raising of the porkers with regard to amount and composition of feed, compensation for change of type of feed, for monitoring the effect of changes in the physical environment of the animals, such as the huts, the area of the field, the arrangement on the field, etc. The statistical data also constitutes an important parameter in the selection of parent animals for breeding.

The separation of animals for slaughtering is typically performed by communicating the number of animals of a given weight that is desired to be separated from the herd to the control unit prior to the actual fetching of the animals, e.g. twelve hours before. Alternatively or additionally, the animals for slaughtering may be chosen due to another parameter such as the thickness of the fat layer on the back of the animal, the time period in which the separation is to take place, based on the registered habits of the animals, the E number of the animals, etc. The control unit then selects the desired number from the animals passing the separation unit and separates these animals to an enclosure provided with drinking water. The progress of the separation process may be monitored at distance via the communication network. The control unit corrects the records on the herd after the animals for slaughtering have been fetched and the data regarding the separated animals may be transferred to the surveillance system so that the data may follow the animals/the meat, optionally all the way to the consumer. In an alternative approach, information is requested from the control unit regarding how many animals of a given size that may be separated within a given time period and the number is predicted based on the registration of the habits of the individual animal. A list of the animals chosen for separation may be supplied from the control unit to the user for manually editing of the list an returning it to the control unit.

A separation command given to the control unit could as an example comprise:
  the breeding unit within a larger system from which the animals should be selected,
  the feeding unit(s) within the breeding unit to separate from,
  the number of animals,
  the time period in which the animals should be separated,
  the date on which the separation should take place,
  the weight range of the animals,
  the thickness range of the fat layer on the back of the animals,
  the upper limit of the registered temperatures of the animal within a given time range,
  the outlet to which the animals should be separated.

The control unit may also be connected with equipment for providing pictures and/or sound from one or more locations of the breeding system and in particular for the separation and feeding arrangement and for transferring these recordings to the surveillance system.

The present invention has been described as having a carrousel with a substantially vertical axis of rotation, but a similar arrangement could be produced with a carrousel having a substantially horizontal axis of rotation, wherein the principle of a common entrance and a common weight is retained. In such an arrangement the animals are not forced to turn around before leaving the feeding enclosures but enter and leave the enclosures in the same direction being parallel to the axis of rotation. Each feeding enclosure must be equipped with means for maintaining a floor part of the enclosure in a substantially horizontal state. Alternatively, the carrousel could by the skilled person be replaced by a series of feeding enclosures arranged on an endless belt driven in a substantially horizontal direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement for individual feeding of animals of a herd comprising:
   a plurality of enclosures each of a size suitable for comprising one of the animals and being arranged on a platform which may turn about a substantially vertical axis, each enclosure having an opening and means for selectively switching the opening between a passable state and a non-passable state for the animals,
   drive means for rotating the platform;
   supply means for supplying feed to each of said enclosures;
   an inlet through which the animals may enter into each one of the enclosures when the opening of said enclosure is in a given inlet angular position;
   means for selectively allowing animals to pass the inlet, the inlet being so arranged that animals may only enter the arrangement when in operation by passing the inlet;
   an outlet through which the animals may exit from each one of the enclosures when the opening of said enclosure is in a given outlet angular position; and
   a weighing enclosure of a size suitable for comprising one of the animals and having means for selectively allowing an animal within the enclosure to leave the enclosure and having means for determining the weight of the animal and means for transmitting the weight to control means for controlling the operation of the arrangement, the weighing enclosure being situated external to the platform and so arranged that animals may only enter, respectively leave, the arrangement when in operation by passing through the weighing enclosure.

2. The arrangement according to claim 1, further comprising expelling means for expelling an animal from each one of the plurality of enclosures when the opening of said enclosure is in the outlet angular position.

3. The arrangement according to claim 1, wherein the weighing enclosure further comprises means for determining at least one of the following characteristics of each animal passing the enclosure and for transmitting the at least one characteristic to the control means:
   a) a temperature of the animal measured by a sensor,
   b) a thickness of the fat layer on the back of the animal, and
   c) an image obtained by a camera.

4. The arrangement according to claim 1, further comprising means for performing a unique identification of each animal of the herd, the means being arranged so as to allow for identification of an animal before letting it into the arrangement.

5. The arrangement according to claim 4, wherein the identification means comprises:
   a plurality of transponders each having a unique identification code, each animal of the herd being equipped with a transponder for individual identification; and
   a transceiver for reading the identification codes of the transponders, the transceiver being arranged near the inlet so as to allow for identification of an animal before letting it into the arrangement.

6. The arrangement according to claim 4, further comprising means for selectively separating identified animals having passed the inlet to at least one separation enclosure.

7. The arrangement according to claim 1, wherein switching between the passable state and the non-passable state of the opening of each of the plurality of enclosures is being performed by the rotational movement of the platform.

8. The arrangement according to claim 1, further comprising:
   monitoring means for monitoring the load on the drive means and producing an output accordingly; and
   drive control means for selectively halting the operation of the drive means in response to the output from the monitoring means.

9. The arrangement according to claim 1, further comprising:
   safety means for automatically allowing animals within the arrangement to leave the arrangement; and
   safety control means to activate said safety means in response to malfunction of the arrangement that otherwise would entrap any of the animals in the arrangement.

10. The arrangement according to claim 1, wherein the control means can control the amount of and optionally the type of feed supplied to the individual animal.

11. The arrangement according to claim 1, further comprising means for adjusting the amount of feed supplied to the individual animal according to the temperature and optionally the wind speed the animals are subjected to.

12. The arrangement according to claim 1, wherein the herd of animals comprises a plurality of porkers.

13. The arrangement according to claim 4, wherein the control unit comprises means for determining whether an identified animal should be separated from the herd and means for activating separation means unit so as to separate said animal from the weighting enclosure into a separation enclosure.

14. The arrangement according to claim 13, wherein a temperature of the identified animal is determined automatically within the weighing enclosure and the separation of the identified animal may be effected by the control unit in response to the determined temperature of said animal.

15. The arrangement according to claim 1, wherein the control unit is at least temporarily connected via a data communication network to a remote surveillance system whereby the operation of the control unit may be remotely monitored and at least partially controlled.

16. An arrangement for individual feeding of animals of a herd comprising:
   a plurality of enclosures each of a size suitable for comprising one of the animals and being arranged on a platform which may turn about a substantially vertical axis, each enclosure having an opening and means for selectively switching the opening between a passable state and a non-passable state for the animals;

drive means for rotating the platform;

supply means for supplying feed to each of said enclosures;

an inlet through which the animals may enter into each one of the enclosures when the opening of said enclosure is in a given inlet angular position;

means for selectively allowing animals to pass the inlet, the inlet being so arranged that animals may only enter the arrangement when in operation by passing the inlet;

an outlet through which the animals may exit from each one of the enclosures when the opening of said enclosure is in a given outlet angular position;

means for determining the weight of each animal and means for transmitting the weight to control means for controlling the operation of the arrangement; and expelling means for expelling an animal from each one of the plurality of enclosures when the opening of said enclosure is in the outlet angular position.

17. The arrangement according to claim 16, further comprising a weighing enclosure of a size suitable for comprising one of the animals, the weighing enclosure having means for selectively allowing an animal within the enclosure to leave the enclosure, the means for determining the weight of the animal being arranged within the weighing enclosure.

18. The arrangement according to claim 17, wherein the weighing enclosure further comprises means for determining at least one of the following characteristics of each animal passing the enclosure and for transmitting the at least one characteristic to the control means:

a) a temperature of the animal measured by a sensor;

b) a thickness of the fat layer on the back of the animal; and c) an image obtained by a camera.

19. The arrangement according to claim 17, further comprising means for performing a unique identification of each animal of the herd, the means being arranged so as to allow for identification of an animal before letting it into the arrangement.

20. The arrangement according to claim 19, wherein the identification means comprises:

a plurality of transponders each having a unique identification code, each animal of the herd being equipped with a transponder for individual identification; and a transceiver for reading the identification codes of the transponders, the transceiver being arranged near the inlet so as to allow for identification of an animal before letting it into the arrangement.

21. The arrangement according to claim 19, further comprising means for selectively separating identified animals having passed the inlet to at least one separation enclosure.

22. The arrangement according to claim 16, wherein switching between the passable state and the non-passable state of the opening of each of the plurality of enclosures is being performed by the rotational movement of the platform.

23. The arrangement according to claim 16, further comprising:

monitoring means for monitoring the load on the drive means and producing an output accordingly; and drive control means for selectively halting the operation of the drive means in response to the output from the monitoring means.

24. The arrangement according to claim 16, further comprising:

safety means for automatically allowing animals within the arrangement to leave the arrangement; and safety control means to activate said safety means in response to malfunction of the arrangement that otherwise would entrap any of the animals in the arrangement.

25. The arrangement according to claim 16, wherein the control means can control the amount of and optionally the type of feed supplied to the individual animal.

26. The arrangement according to claim 16, further comprising means for adjusting the amount of feed supplied to the individual animal according to the temperature and optionally the wind speed the animals are subjected to.

27. The arrangement according to claim 16, wherein the herd of animals comprises a plurality of porkers.

28. The arrangement according to claim 19, wherein the control unit comprises means for determining whether an identified animal should be separated from the herd and means for activating separation means unit so as to separate said animal from the weighing enclosure into a separation enclosure.

29. The arrangement according to claim 28, wherein a temperature of the identified animal is determined automatically within the weighing enclosure and the separation of the identified animal may be effected by the control unit in response to the determined temperature of said animal.

30. The arrangement according to claim 16, wherein the control unit is at least temporarily connected via a data communication network to a remote surveillance system whereby the operation of the control unit may be remotely monitored and at least partially controlled.

* * * * *